United States Patent
Chiu et al.

(10) Patent No.: US 8,978,025 B2
(45) Date of Patent: Mar. 10, 2015

(54) SERVER AND METHOD FOR UPDATING FIRMWARE OF SERVER

(71) Applicants: Inventec (Pudong) Technology Corporation, Shanghai (CN); Inventec Corporation, Taipei (TW)

(72) Inventors: Kuo-Shu Chiu, Taipei (TW); Chien-Chou Chen, Taipei (TW); Jo-Yu Chang, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 110 days.

(21) Appl. No.: 13/793,578

(22) Filed: Mar. 11, 2013

(65) Prior Publication Data
US 2014/0137095 A1    May 15, 2014

(30) Foreign Application Priority Data
Nov. 9, 2012    (CN) .......................... 2012 1 0446923

(51) Int. Cl.
| G06F 9/44 | (2006.01) |
| G06F 9/00 | (2006.01) |
| G06F 1/00 | (2006.01) |
| G06F 7/38 | (2006.01) |
| G06F 9/445 | (2006.01) |

(52) U.S. Cl.
CPC ........................................ G06F 8/65 (2013.01)
USPC .................................. 717/172; 713/2; 326/37

(58) Field of Classification Search
None
See application file for complete search history.

(56) References Cited

U.S. PATENT DOCUMENTS

| 7,240,222 B1 * | 7/2007 | Falik et al. .................... 713/300 |
| 2006/0212694 A1 * | 9/2006 | Koizumi ............................ 713/2 |
| 2013/0179870 A1 * | 7/2013 | Kelso et al. ................... 717/169 |

* cited by examiner

*Primary Examiner* — Lewis A Bullock, Jr.
*Assistant Examiner* — Jacob Dascomb
(74) *Attorney, Agent, or Firm* — Morris Manning & Martin LLP; Tim Tingkang Xia, Esq.

(57) ABSTRACT

The disclosure provides a server including a baseboard management controller (BMC), a programmable logic device (PLD) and a blocking unit. The BMC receives an update instruction, and according to the update instruction, generates a firmware update data. The BMC generates an update signal according to on a reception state of the update instruction. The PLD is coupled to the BMC, receives the firmware update data to update a firmware. When the firmware is updated, the PLD generates a restart signal. The blocking unit is coupled to the BMC and the PLD, receives the update signal and the restart signal, and according to the update signal, determines whether to block the restart signal.

6 Claims, 2 Drawing Sheets

SERVER AND METHOD FOR UPDATING FIRMWARE OF SERVER

CROSS-REFERENCE TO RELATED APPLICATIONS

This non-provisional application claims priority under 35 U.S.C. §119(a) on Patent Application No(s). 201210446923.0 filed in China on Nov. 9, 2012, the entire contents of which are hereby incorporated by reference.

BACKGROUND OF THE INVENTION

1. Technical Field

The disclosure relates to a firmware update technology, and more particularly to a server and a method for updating a firmware of a server.

2. Related Art

Generally, servers need to update the firmware of a programmable logic device (PLD) in every server, in order to maintain the server and to upgrade some functions thereof. When the updating of firmware is preformed, the PLD needs to be taken apart from the server before a new version of the firmware is installed into the PLD. This causes a longer working period for updating the firmware. If a controller such as a baseboard management controller (BMC) in the server is employed to update the firmware of the PLD, the time required for updating the firmware could be significantly saved. However, the BMC connects to the PLD, and the operation of the BMC is associated with the operation of the PLD. When the PLD restarts, the PLD provides a restart signal to the BMC When the PLD ceases its operation to update the firmware, the BMC also ceases its operation. This may interrupt the process of updating the firmware and cause the failure of the firmware updating.

SUMMARY OF THE INVENTION

The disclosure provides a server including a baseboard management controller (BMC), a programmable logic device (PLD) and a blocking unit. The BMC receives an update instruction, generating a firmware update data according to the update instruction, and generates an update signal according to a reception state of the update instruction. The PLD is coupled to the BMC, receives the firmware update data to update a firmware, and when updating the firmware, the PLD generates a restart signal. The blocking unit is coupled to the BMC and PLD, receives the update signal and the restart signal, and according to the update signal, determines whether to block the restart signal.

In one embodiment, the BMC is coupled to the PLD through a joint test action group, a general peripheral input and output, or a serial peripheral interface.

In one embodiment, the blocking unit is an AND gate.

In one embodiment, when the BMC receives the update instruction, the BMC enables the update signal and the blocking unit to block the restart signal. On the other hand, when the BMC does not receive the update instruction yet, the BMC disables the update signal and the blocking unit outputs the restart signal.

In one embodiment, the BMC receives the update instruction through a wired network or a wireless network.

The disclosure further provides a method for updating a firmware in the server. The update instruction is received via the BMC. The firmware update data is generated according to the update instruction, and an update signal is enabled. The firmware of the PLD is updated by using the firmware update data. When the firmware of the PLD is updated, a restart signal is generated and is blocked according to the update signal.

In an embodiment, the method further includes follow steps. Any update instruction is determined whether to exist, via the baseboard management controller. When the update instruction exists, the update instruction is received by the BMC. Otherwise, the update signal is disabled.

In the disclosure, the blocking unit determines whether to block the restart signal generated by the PLD, according to the update signal generated by the BMC, to prevent the PLD from being restarted when the firmware of the PLD is updated. Thus, the updating of the firmware may be performed more successfully, which saves more time associated with the updating of the firmware and significantly reduces the cost of the maintenance of the server.

BRIEF DESCRIPTION OF THE DRAWINGS

The present disclosure will become more fully understood from the detailed description given herein below for illustration only, and thus does not limit the present disclosure, wherein.

DETAILED DESCRIPTION

Figure 1:
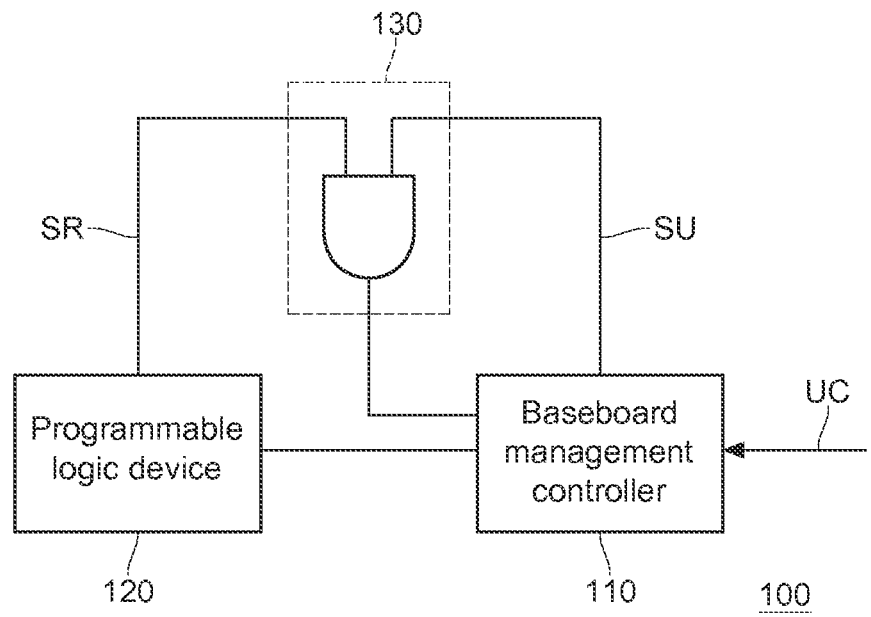
FIG. 1 is a schematic diagram of a server according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a server according to the disclosure. The server 100 includes a baseboard management controller (BMC) 110, a programmable logic element (PLD) 120 and a blocking unit 130. In one embodiment and some embodiments, the BMC 110, the PLD 120 and the blocking unit 130 are disposed on a motherboard of the server 100.

The BMC 110 receives an update instruction UC, and according to the update instruction UC, generates a firmware update data. In one embodiment, the update instruction UC includes a new version of a firmware update image file. Since the BMC 110 receives the update instruction UC via a wired or wireless network, the new version of the firmware update image file is sent to the BMC 110 via the wired or the wireless network. The BMC 110 outputs the new version of the firmware update image file as a firmware update data to updating the firmware.

The BMC 110 generates an update signal SU according to a reception state of the update instruction UC. For example, when the BMC 110 receives the update instruction UC, the BMC 110 enables the update signal SU, such as generating a low logic level of the update signal SU. On the other hand, when the BMC 110 does not receive the update instruction UC, the BMC 110 disables the update signal SU, for example, generating a high logic level of the update signal SU.

The PLD 120 is coupled to the BMC 110 to receive the firmware update data for updating the firmware. In one implementation, when the PLD 120 updates the firmware, the BMC 110 provides a control signal to cease the operation of the PLD 120, and writes the firmware update data into the PLD 120 so as to update the firmware.

The PLD 120 has instructions for booting the server 100, stored therein. The PLD 120 ceases its operation when the firmware is updated. When the firmware is updated completely, the PLD 120 restarts, and operates with the updated firmware, so that the server 100 can operate normally.

Accordingly, the PLD 120 generates a restart signal SR when the firmware of the PLD 120 is updated, so as to notify electronic components connected to the PLD 120 that the PLD 120 is restarted. Herein, the notified electronic components perform their corresponding restarting tasks.

A blocking unit 130 is coupled to the BMC 110 and the PLD 120, receives the update signal SU and the restart signal SR, and according to the update signal SU, determines whether to block the restart signal SR or not. For example, when the update signal SU is a low logic level which indicates that a new version of the firmware is used for updating the PLD 120, the blocking unit 130 blocks the restart signal SR. Thus, the restart signal SR is not outputted to the BMC 110 whereby the BMC 110 stops operating and does not write the firmware update data into the PLD 120. In contrast, when the update signal SU is a high logic level which indicates that no new version of the firmware can be used for updating the PLD 120, the blocking unit 130 does not block the restart signal SR. Thus, when the PLD restarts, the restart signal SR is transmitted to the BMC 110 whereby the BMC 110 correspondingly restarts.

Specifically, the blocking unit 130 is, for example, an AND gate. The two input ends of the AND gate respectively receive the update signal SU and the restart signal SR. The output end of the AND gate outputs an output signal according to the logic levels of the update signal SU and the restart signal SR. The following Table 1 is a truth table representing the relationship among the output signal of the AND gate, the update signal SU, and the restart signal SR, where H represents a high logic level, and L represents a low logic level.

TABLE 1

| Update signal (SU) | Restart signal (SR) | Output signal |
|---|---|---|
| L | L | L |
| L | H | L |
| H | L | L |
| H | H | H |

As illustrated in Table 1, when the update signal SU is a low logic level, the output signal of the AND gate is always a low logic level regardless of the logic levels of the restart signal SR. This indicates that the blocking unit 130 blocks the restart signal SR. On the other hand, when the update signal SU is a high logic level, the logic level of the output signal of the AND gate depends on the logic level of the restart signal SR. Herein, the logic level of the output signal corresponds to the logic level of the restart signal SR, and this represent that the restart signal SR is not blocked by the blocking unit 130. For example, when the restart signal SR is a high logic level, the output signal is a high level. This represents that the PLD 120 restarts. Similarly, when the restart signal SR is a low logic level, the output signal is a low logic level. This represents that the PLD 120 works normally.

Accordingly, the blocking unit 130 determines whether to block the restart signal SR generated by the PLD 120, according to the update signal SU generated by the BMC 110. Thus, the BMC 110 does not restart in the period of updating the firmware, so as to avoid the failure in the firmware updating. Consequently, the updating of the firmware is performed in a more efficient manner, and the maintenance cost which users spend on may be reduced.

In one embodiment, the BMC 110 is coupled to the PLD 120 through a joint test action group (JTAG), a general purpose input output (GPIO), or a serial peripheral interface (SPI)-based interface, to communicate with each other.

The PLD 120 is, for example, a generic array logic (GAL) element, a complex programmable logic device (CPLD) element or a field-programmable gate array (FPGA) element.

The server 100 is disposed within a rack, serves as one of the nodes in the rack. The rack includes a plurality of the servers 100, for providing various services. The rack includes a rack management controller (RMC) which communicates with the servers 100 through, for example, a local area network (LAN).

The update data is delivered to the RMC, and then the RMC delivers the update instruction corresponding to the received update data, to the BMC 110 of each of the servers 100 through a transmission channel, for example, the LAN. The BMC 110 thereafter outputs the firmware update data corresponding to the update instruction, to the PLD 120, so as to update the firmware. The transmission channel is, for example, an intelligent platform management interface (IPMI) and a web user interface.

Figure 2:
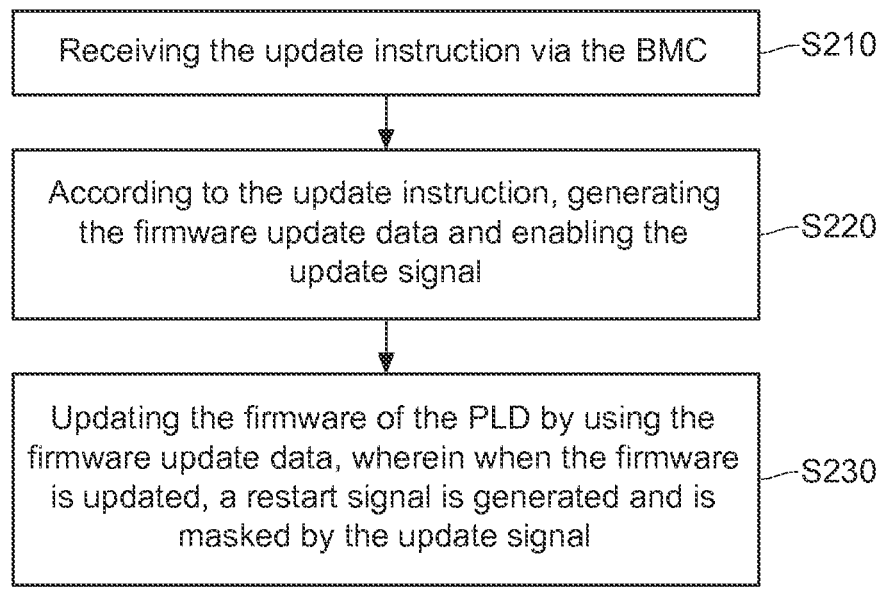
FIG. 2 is a flow chart of a method for updating a firmware of a server according to the disclosure.

FIG. 2 is a flowchart of a method for updating a firmware of a server according to the disclosure. In step S210, the update instruction is received through the BMC (step S210). In step S220, according to the update instruction, the firmware update data is generated, and the update signal is enabled. In step S230, for a firmware of the PLD is updated according to the firmware update data. When the firmware is updated, a restart signal is generated and, according to the update instruction, is blocked.

Figure 3:
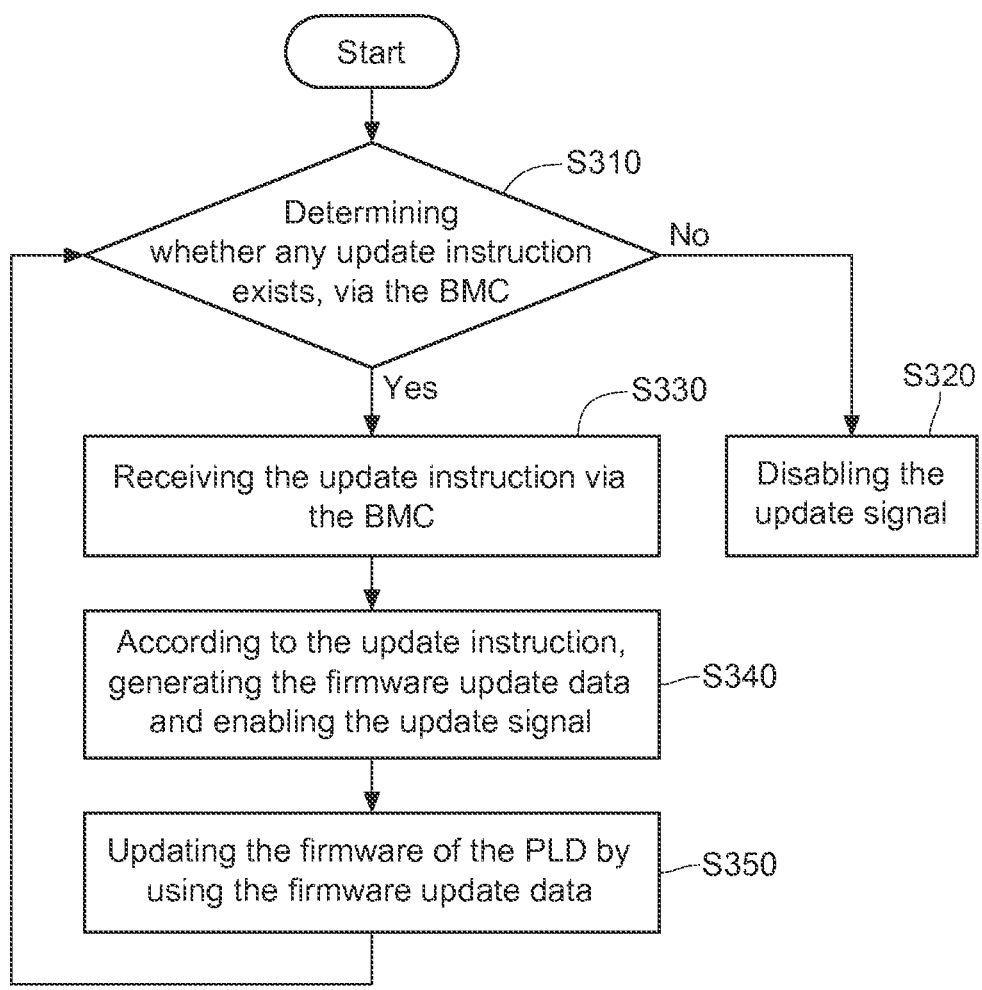
FIG. 3 is a flow chart of another method for updating a firmware of a server according to the disclosure.

FIG. 3 is a flow chart of another method for updating a firmware of a server according to the disclosure. In step S310, via the BMC, any update instruction is determined whether to exist. When no update instruction exists, the update signal is disabled in step S320. On the other hand, when an update instruction exists, the update instruction is received through the BMC in step S330. In step S340, the firmware update data is generated, and the update signal is enabled, according to the update instruction. In step S350, the firmware of the PLD is updated according to the firmware update data. When the firmware of the PLD is updated, the restart signal is generated, and according to the update instruction, is blocked.

In the disclosure, the blocking unit determines whether to block the restart signal generated by the PLD, according to the update signal generated by the BMC. Thus, the BMC does not restart when the firmware is updated, so as to prevent the failing in the firmware updating. Thus, the time required for the updating of the firmware, and the maintenance cost users spend on, may be reduced.

What is claimed is:

1. A server, comprising:
   a baseboard management controller, for receiving an update instruction, generating a firmware update data according to the update instruction, and generating an update signal according to a reception state of the update instruction;
   a programmable logic device, coupled to the baseboard management controller, for receiving the firmware update data to update firmware of the programmable logic device, and for generating a restart signal when updating the firmware; and
   a blocking unit, coupled to the baseboard management controller and the programmable logic device, for receiving the update signal and the restart signal, and according to the update signal, determining whether to block the restart signal.

2. The server according to claim 1, wherein the baseboard management controller is coupled to the programmable logic device through a Joint Test Action Group, a General Peripheral Input and Output, or a Serial Peripheral Interface.

3. The server according to claim 1, wherein when receiving the update instruction, the baseboard management controller enables the update signal and the blocking unit blocks the restart signal, and when the baseboard management controller does not receive the update instruction yet, the baseboard management controller disables the update signal and the blocking unit outputs the restart signal.

4. The server according to claim 1, wherein the baseboard management controller receives the update instruction through a wired network or a wireless network.

5. A method for updating firmware in a server, wherein the server comprises a baseboard management controller, a programmable logic device coupled to the baseboard management controller, and a blocking unit coupled to the baseboard management controller and the programmable logic device, the method comprising:

receiving an update instruction at the baseboard management controller;

according to the update instruction, generating a firmware update data according to the update instruction and sending an update signal by the baseboard management controller, to the blocking unit;

updating firmware of the programmable logic device by using the firmware update data from the baseboard management controller, wherein when the firmware of the programmable logic device is updated, a restart signal is generated by the programmable logic device and is sent to the blocking unit; and blocking by the blocking unit the restarting of the programmable logic device according to the received update signal.

6. The method according to claim 5, further comprising:

determining whether the update instruction exists via the baseboard management controller;

when the update instruction exists, receiving the update instruction via the baseboard management controller; and disabling the update signal when the update instruction does not exist.

* * * * *